Figure 1:
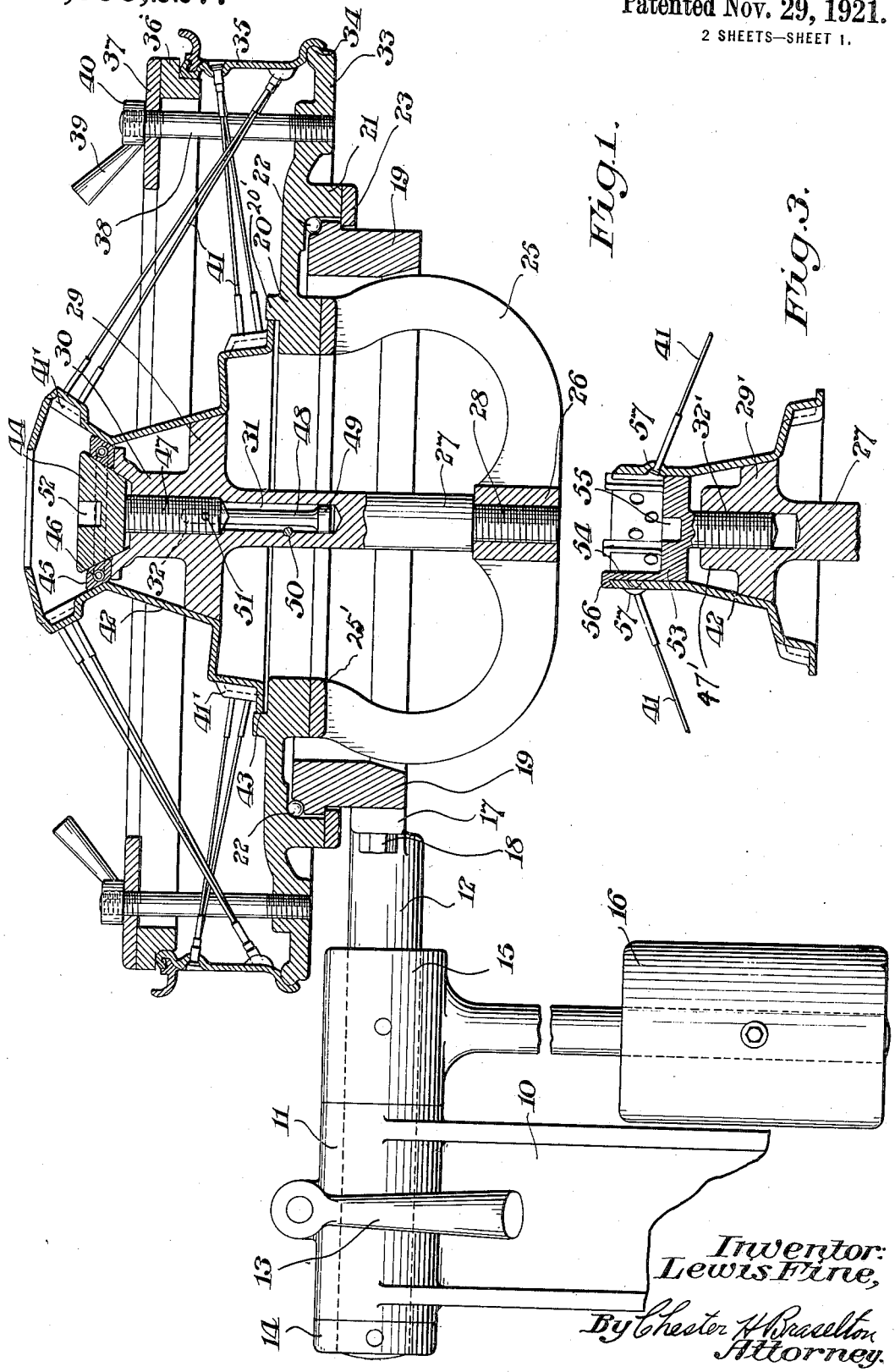
Figure 2:
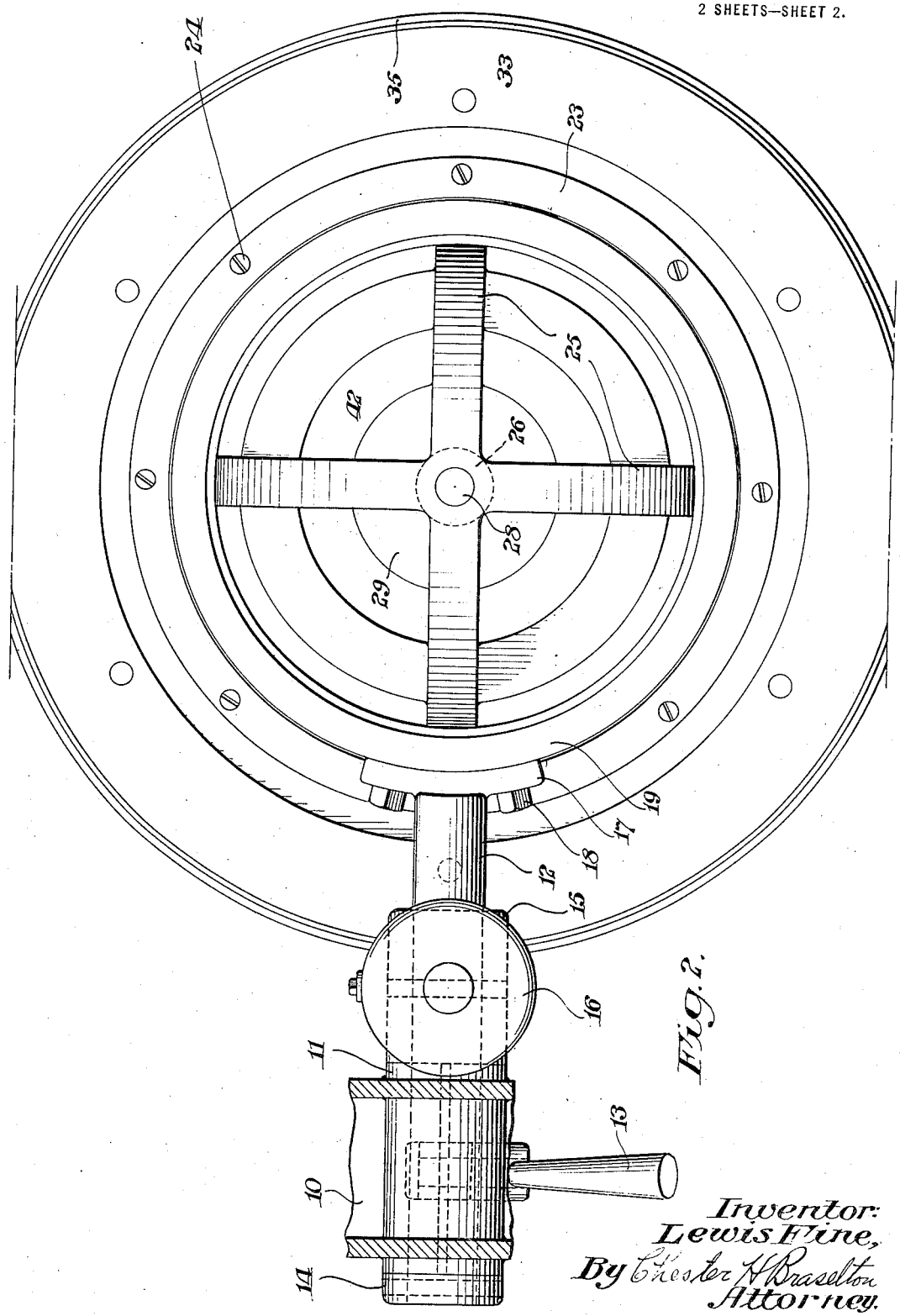

UNITED STATES PATENT OFFICE.

LEWIS FINE, OF PHILADELPHIA, PENNSYLVANIA, ASSIGNOR, BY MESNE ASSIGNMENTS, TO BUDD WHEEL COMPANY, OF PHILADELPHIA, PENNSYLVANIA, A CORPORATION OF PENNSYLVANIA.

APPARATUS FOR ASSEMBLING WIRE WHEELS.

1,398,227.   Specification of Letters Patent.   Patented Nov. 29, 1921.

Application filed September 18, 1919. Serial No. 324,527.

*To all whom it may concern:*

Be it known that I, LEWIS FINE, a citizen of the United States, residing at Philadelphia, county of Philadelphia, and State of Pennsylvania, have invented certain new and useful Improvements in Apparatus for Assembling Wire Wheels, of which I declare the following to be a full, clear, and exact description.

This invention relates to an improved apparatus for assembling wire wheels.

The principal object of my invention is to provide an improved apparatus for assembling wire wheels in which the hub and rim are rigidly clamped and supported in the relative positions which they will occupy in the finished wheel, and which permits the insertion of the spokes and their tightening while the hub and rim are clamped in the apparatus in such positions.

A further object of my invention is to provide such an apparatus which can be reversed and rotated so as to allow easy access while the wheel is being assembled and the spokes tightened.

Further objects, and objects relating to economies of operation and production and details of construction, will definitely appear from the detailed description to follow. I accomplish the objects of my invention by the devices and means described in the following specification. My invention is clearly defined and pointed out in the appended claims. A structure, which may be a preferred embodiment of my invention, is illustrated in the accompanying drawing, forming a part of this specification, in which :—

Figure I is a view, partly in side elevation and partly in vertical section, through an apparatus embodying my invention.

Fig. II is a bottom plan view of the apparatus, and

Fig. III is a detail, sectional view of a modification, adapted for a modified form of hub, taken on a line corresponding to a part of Fig. I.

In the drawing, similar reference numerals refer to similar parts throughout the several views.

Considering the numbered parts of the drawing, I have shown an apparatus comprising a supporting standard 10, having a trunnion 11, at its upper end, in which the shaft 12 is journaled, being held from lateral movement by the washer 14 which is pinned to the shaft. The trunnion 11 may be of the split-sleeve type, the parts of which are drawn together by a clamping screw 13 to releasably clamp the shaft 12 against rotation. A sleeve 15 is pinned to the shaft 12 and carries the counter-weight 16. At the end of the shaft 12, there is formed a bracket 17 which is bolted to a ring 19 by the bolts 18.

The annular base 20 of the wheel supporting table overhangs the ring 19 and has a downwardly extending annular flange 21 which lies around the upper part of the ring 19. Race ways are provided on the upper part of the ring 19 and the lower part of the annular base 20, facing each other, and a plurality of balls 22 roll in said race ways, so that the annular base 20 of the table is rotatively mounted on the ring 19, so as to rotate around an axis at right angles thereto. A ring 23 is fastened to the bottom of the flange 21 by the screws 24, and extends beneath an annular shoulder on the ring 19 so as to prevent separation of the base and the ring.

A ring 25′ is secured to the lower central part of the base 20 and four spider arms 25 extend downwardly and inwardly from said ring to the spider hub 26 which is in line with the axis of the ring 19 and annular base 20. The lower end of the post 27 is reduced in diameter and threaded into the spider hub 26, as indicated at 28. Near the upper end of the post 27, there is provided a laterally extending flange 29 on which the hub of the wheel is seated and the exterior of this flange 29 corresponds to the interior seating surface of the hub 42 of the wheel. When this apparatus is used in connection with wheels having a pyramidal drive, and in which the internal seating surface of the hub 42 is pyramidal in form, the external seating surface of the flange 29 will be pyramidal in form. The upper end 30, of the post 27, is of smaller diameter than the flange 29, and is provided with a central socket 32, which is internally threaded and has an axially disposed socket 31, of smaller diameter, leading from it down into the post 27.

From the flange 21 of the base 20 there extends laterally an annular flange 33 having a curved peripheral rim seat 34 on which one edge of the wheel rim 35 seats. A ring 36 seats on the other edge of the wheel rim 35 and the rim is clamped in place by the clamping bolts 38, extending through a plate 37 fastened to the ring 36. The clamp nuts 40, with the handles 39, are screwed on the upper ends of the clamping bolts 38.

The rim 35 of the wheel is connected with the hub 42 by the spokes 41, which, in this case, I have shown in two sets, the inner ends of said spokes being anchored in spoke seats 41' formed in the hub. The edge of the inner flange of the hub 42 engages an annular shoulder 20' in the base 20, so that the hub 42 is absolutely centered with reference to the base 20. A tapered wedge-block 44 has a downwardly extending threaded stud 47 which is screwed into the socket 32 of the head 30 of post 27. A rod 48 is pinned to the stud 47 by the pin 51 and extends into the socket 31. This rod 48 has an enlarged head 49 and a cross-pin 50 is inserted through the post 27, part of it entering the socket 31 above the part 49, so that the enlarged part 49 will strike the pin 50, and limit the withdrawal of the tapered wedge-block 44 and the stud 47. A plurality of tapered locking pieces 45 are mounted loosely on an annular spring 46 and engaged by the tapered wedge-block 44 as it is screwed into place to force the locking pieces outwardly against the outwardly flared portion of the hub 42. This clamps the hub in place on the hub seat 29. A square socket 52 is provided in the tapered wedge-block 44 in which a square headed wrench may be inserted to rotate the block.

In Fig. III, I have shown a modified construction which is designed for a modified form of hub. In this construction, the post 27 has a hub seat 29' on which the hub 42 is seated. Block 53 has a downwardly extending stud 47' which screws into the socket 32' of the post. The block 53 has a plurality of upwardly extending arms 54 which engage the inner side of the end of the hub and which have laterally extending fingers 56 which overhang the end of the hub. These arms are arranged to lie between the spoke seats 57 in which the ends of the spokes 41 are anchored. A square wrench socket 55 is provided in the block 53.

From the description of the parts given above, the operation of this device should be very readily understood. The rim 35 is rigidly clamped in position with one edge engaging the rim seat 34 of the table all the way around. The position of the hub seat 29 on the post 27 is definitely fixed with reference to the rim seat 34 and the rim 35, and, therefore, the hub shell 42 may be clamped in place in a predetermined position relative to the rim 35. When the hub and rim are clamped in their positions, the spokes are inserted through the openings in the spoke seats 41'. The spokes connected to the outer end of the hub are inserted through the opening at the outer end of the hub, and, since the block 24 and the locking devices are disposed below the spoke seats, they do not interfere with the insertion of the spokes. The other set of spokes is inserted through the lower spoke seats being passed into position between the arms 25, and through the central opening in the table 20. After the spokes have been inserted, they are engaged with nipples inserted through the nipple seats in the rim and these nipples are then screwed up from the outside of the rim until the spokes are tightened. This may be done by hand or by a power screw driver having slip-clutch mechanism which slips when the proper tension has been applied. The entire wheel is carried by the table 20 and, since this is rotatively mounted, the wheel can be turned around to present the nipples to the operator as he tightens them. The clamp 13 may be loosened and the table reversed to permit the operator to insert the lower set of spokes from above. The counter weight 16 acts to balance the weight of the wheel and the weight of table 20, thus making it easier to manipulate the table.

I am aware that the particular embodiment of my invention, which I have shown and described here, is susceptible of considerable variation without departing from the spirit thereof, and, therefore, I desire to claim the same broadly, as well as specifically, as indicated by the appended claims.

Having thus described my invention, what I claim as new and desire to secure by Letters Patent, is:

1. In an apparatus of the class described, the combination of a table, means for clamping a wheel rim on said table in a predetermined position, and means for clamping a wheel hub, having a plurality of spoke seats formed therein, in a predetermined position relative to said rim, said clamping means permitting access to the inside of said hub at the end thereof, to permit the insertion of spokes through said spoke seats from the inside of said hub.

2. In an apparatus of the class described, the combination of a table, means for clamping a wheel rim on said table in a predetermined position, and means for clamping a wheel hub, having a plurality of spoke seats at the outer end thereof, in a predetermined position relative to said rim, said clamping means including a seat carried by said table on which said hub is mounted and means for clamping the hub on said seat which permit access to the inside of said hub at the outer end thereof to permit the insertion of spokes through said spoke seats from the inside of the hub.

3. In an apparatus of the class described, the combination of a table, means for clamping a wheel rim on said table in a predetermined position, a seat carried by said table, means for clamping a wheel hub, having a plurality of spoke seats formed in the inner end thereof, on said seat, said table being provided with an opening adjacent said seat, to permit the insertion of spokes through said spoke seats from the inside of the hub.

4. In an apparatus of the class described, the combination of a table, a seat carried by said table, means for clamping a wheel hub, having a plurality of spoke seats formed therein, on said seat, said clamping means permitting access to the inside of said hub at both ends thereof to permit the insertion of spokes through said spoke seats from the inside of the hub, and means for clamping a rim in predetermined position relative to said hub.

5. In an apparatus of the class described, the combination of a support, a table mounted thereon and having a central opening therein, said table having an annular flange adjacent the edge of said opening, and adapted to be engaged by the edge of the inner flange of the wheel hub, and a seating portion, means for clamping said wheel hub on said seating portion in a predetermined position relative to said table, and means for clamping a wheel rim on said table in a predetermined position relative to said hub.

6. In an apparatus of the class described, the combination of a table having a central opening therein, a spider having a plurality of arms, the ends of which are connected to said table adjacent the edge of said central opening, a post centrally supported by said spider and having a wheel hub seat, means for clamping a wheel hub on said seat, and means for clamping a wheel rim on said table in a predetermined position relative to said wheel hub.

7. In an apparatus of the class described, the combination of a support, a table mounted thereon and having a central opening therein, said table having an annular flange adjacent the edge of said opening and adapted to be engaged by the edge of the inner flange of a wheel hub, a spider having a plurality of arms the ends of which are connected to said table adjacent the central opening, a post carried by said spider and axially disposed with reference to the table, said post having a wheel hub seat, means for clamping the wheel hub on said seat, and means for clamping a wheel rim on said table in a predetermined position relative to said wheel hub.

8. In an apparatus of the class described, the combination of a support, a table mounted thereon and having a central opening therein, a spider having a plurality of arms secured to said table adjacent the central opening, a post carried by said spider and axially disposed with reference to said table and having a wheel hub seat, means for clamping a wheel hub having a plurality of spoke seats on said wheel hub seat, said clamping means and said wheel hub seat being so constructed as to permit free access to said spoke seats, and means for clamping a wheel rim on said table in a predetermined position relative to said wheel hub.

9. In an apparatus of the class described, the combination of a support, a table mounted thereon and having a central opening therein, a spider connected to said table adjacent the edge of said central opening, a post carried by said spider and axially disposed with reference to said table, said post having a wheel hub seat, a block having a screw-threaded connection with said post and adapted to clamp a wheel hub on said seat, and means for clamping a wheel rim in a predetermined position with reference to said hub.

10. In an apparatus of the class described, the combination of a support, a table mounted thereon, means for clamping a wheel hub in a predetermined position with reference to said table, said table having a peripheral rim seat on which one edge of a wheel rim may be seated, a clamping ring adapted to engage the opposite edge of said wheel rim, and clamping bolts connecting said table and said ring for clamping the wheel rim in a predetermined position relative to said wheel hub.

11. In an apparatus of the class described, the combination of a support, a ring carried by said support, a table rotatively mounted on said ring, means for clamping a wheel hub in a predetermined position on said table, and means for clamping a wheel rim on said table in a predetermined position relative to said hub.

12. In an apparatus of the class described, the combination of a support, a ring carried thereby, a table rotatively mounted on said ring, means for clamping a wheel hub in a predetermined position on said table with the axis of said hub coinciding with the axis of said ring, and means for clamping a wheel rim in a predetermined position with reference to said hub.

13. In an apparatus of the class described, the combination of a support, a ring carried thereby, a table rotatively mounted on said ring, means for clamping a wheel hub, having a plurality of spoke seats, on said table with its axis coincident with that of the ring, said clamping means permitting free access to said spoke seats, and means for clamping a wheel rim on said table in a predetermined position relative to said wheel hub.

14. In an apparatus of the class described, the combination of a support, a ring carried thereby, a table rotatively mounted on said ring and having a central opening therein, a spider connected to said table adjacent the edge of said central opening, the arms of said spider extending through said ring, a post carried by said spider and axially disposed with reference to said ring, means for clamping a wheel hub in a predetermined position on said post, and means for clamping a wheel rim on said table in a predetermined position relative to said hub.

15. In an apparatus of the class described, the combination of a support, a shaft rotatively mounted thereon, a ring carried by said shaft, a table rotatively mounted on said ring, means for clamping a wheel hub on said table in a predetermined position relative thereto, and means for clamping a wheel rim on said table in a predetermined position relative to said hub.

16. In an apparatus of the class described, the combination of a support, a shaft rotatively mounted therein, a ring carried by said shaft with its axis transverse to the axis of the shaft, a table rotatively mounted on said ring, means for clamping a wheel hub on said table with its axis coincident with the axis of the ring, and means for clamping a wheel rim on said table in a predetermined position relative to said hub.

17. In an apparatus of the class described, the combination of a support, a shaft rotatively mounted therein, a ring carried by said shaft with its axis transverse to the axis of the shaft, a table rotatively mounted on said ring, means for clamping a wheel hub on said table with its axis coincident with that of the ring, means for clamping a wheel rim on said table in a predetermined position relative to the wheel hub, and a counter weight on said shaft adapted to counter balance the weight of said table and the parts carried thereby.

18. In an apparatus of the class described, the combination of a support, a shaft rotatively mounted therein, means for clamping said shaft against rotation, a ring carried by said shaft with its axis transverse to that of the shaft, a table rotatively mounted on said ring, means for clamping a wheel hub on said table with its axis coincident with that of the ring, and means for clamping a wheel rim on said table in a predetermined position relative to said hub.

In testimony whereof, I affix my signature.

LEWIS FINE.